July 2, 1957 E. J. VOGEL 2,798,145
ARC WELDING TORCH WITH ADJUSTING MEANS
FOR NON-DEPOSITING ELECTRODE
Filed Feb. 3, 1955
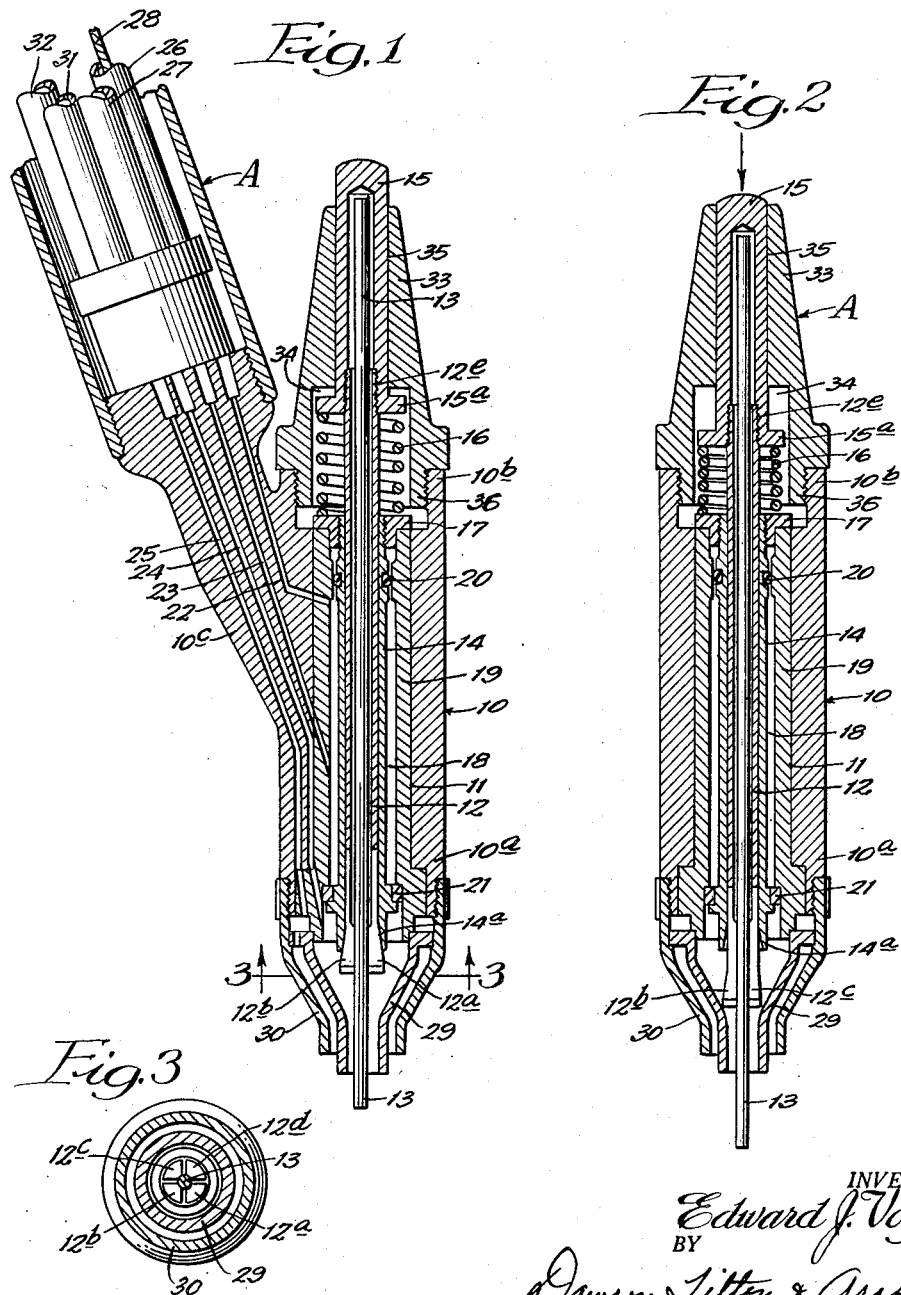
INVENTOR:
Edward J. Vogel,
BY
Dawson, Tilton & Graham,
ATTORNEYS

United States Patent Office 2,798,145
Patented July 2, 1957

2,798,145

ARC WELDING TORCH WITH ADJUSTING MEANS FOR NON-DEPOSITING ELECTRODE

Edward J. Vogel, Chicago, Ill., assignor to The Liquid Carbonic Corporation, Chicago, Ill., a corporation of Delaware Application February 3, 1955, Serial No. 485,975

1 Claim. (Cl. 219—75)

This invention relates to an arc welding torch with an adjusting means for a non-depositing electrode, and is specifically concerned with the adjusting means itself, although the invention has certain other related aspects.

Arc welding torches equipped with non-depositing electrodes, or non-consumable electrodes as they are sometimes called, have been in widespread commercial use for a number of years, and their use in conjunction with inert gas shielding is presently on the increase. Although with this type of welding torch, the electrode is not deposited along the weld line, it is not strictly accurate to say that the electrode is not consumed during the welding process. Even with tungsten or tungsten-thorium electrodes there apparently is some loss of metal from the electrode tip, and for this reason as well as others the electrode position must be readjusted at frequent intervals. For example, when torches are used almost continuously, it is common practice to adjust the electrode as often as every thirty or forty minutes, and it is rare that an electrode will remain correctly positioned for longer than two hours. Also, when oxidized or contaminated with foreign metal, such electrodes are commonly ground off to a shorter length.

The above requirement has created a problem in connection with the practical operation of non-depositing electrode welding torches. For convenience and ease of making the necessary adjustments, the electrodes should be held rather loosely, permitting them to be moved outwardly or inwardly with respect to the torches. On the other hand, to give assurance that the electrode position will not change accidentally and to provide for proper heat and electrical conduction respectively from and to the electrode, it is desirable to have the electrodes securely anchored within the torches while being in good heat and electrical conducting relation with other elements within the torches.

Heretofore, various electrode adjusting means have been provided in an effort to achieve these desirable objectives, but all of them which applicant has seen have tended to sacrifice ease of adjustability in order to achieve the other objectives. This tends to unduly delay the adjustments, which must be made as a routine matter in continuous welding operations. Further, the internal elements associated with the electrode as well as the electrode itself become very hot during the welding operation, and this may create a hazard if it is necessary to partially disassemble the torch in adjusting the electrode. Also, prior adjusting means required the use of both hands.

It is therefore a general object of this invention to provide an arc welding torch with an adjusting means for a non-depositing electrode which substantially overcomes the problems and difficulties discussed above. More specifically, it is an object to provide an adjusting means of the character described which permits the non-depositing electrode to be repositioned without disassembling any part of the torch, while at the same time protecting the operator from the hot elements of the torch, in the event the adjustment is made between or immediately after welding, as will frequently be the case. Another specific object is to provide an adjusting means which can be operated with one hand. Further objects and advantages will appear as the specification proceeds.

This invention is shown in an illustrative embodiment in the accompanying drawing, in which—

Fig. 1 is a side sectional view of a welding torch constructed in accordance with the present invention, showing the electrode adjusting means in retracted position; Fig. 2, a front sectional view of the welding torch of Fig. 1, showing the adjusting means in advanced position; and Fig. 3, a transverse sectional view of the same torch taken on line 3—3 of Fig. 1.

In the illustration given, there is shown an arc welding torch A having a body 10 with a front end portion 10a and a rear end portion 10b. Body 10 also provides an angularly disposed extension 10c, which can be formed integrally with the rest of the body 10. Preferably, body 10 is composed of a heat insulating material such as hard rubber or plastic, and can conveniently be formed in one piece by a molding operation.

Body 10 has an opening 11 extending therethrough from its front to its rear ends, which in the illustration given forms a longitudinally extending or axial bore within the elongated and generally cylindrical main portion of body 10. Within body opening 11 there is provided a slidably supported collet 12 which is in turn adapted for slidably receiving a non-depositing electrode 13. More specifically, collet 12 is tubular and has an internal diameter slightly larger than that of electrode 13, so that electrode 13 can be inserted within collet 12 and moved with respect thereto.

In accordance with this invention, collet 12 should have means associated therewith for releasably gripping electrode 13. Also, there should be provided within body opening 11 means for actuating the gripping means to grip the electrode and for clamping collet 12 against further rearward movement when the collet has moved rearwardly to a certain position.

In the illustration given, the releasable gripping means consists of the plurality of outwardly flared gripping fingers provided by the forward end portion of collet 12. These fingers, being four in number, are identified respectively by the numbers 12a, 12b, 12c and 12d. These fingers, as shown in Figs. 1 and 2, also normally extend inwardly somewhat further than the interior walls of collet 12 to provide an opening therebetween of substantially the same diameter as electrode 13, thereby providing a rather tight sliding fit between the electrode and the gripping fingers.

In connection with the structure just described, it is also preferred to provide a tubular quill 14 secured within body opening 11 in fixed relation to body 10. Quill 14 is dimensioned internally to slidably receive collet 12, and at its front end is provided with an inwardly tapering throat 14a. Throat 14a is shaped to conform to the outside of gripping fingers 12a—12d, and as illustrated more clearly in Fig. 1, provides the means for actuating the electrode gripping means while at the same time clamping collet 12 against further rearward movement. Specifically, when collet 12 with electrode 13 therein is drawn rearwardly until gripping fingers 12a—12d are firmly seated within throat 14a, the gripping fingers are forced inwardly against electrode 13, thereby securely clamping the electrode, while at the same time the engagement between the gripping fingers and the throat prevents any further rearward movement of collet 12.

For the purpose of assuring that the interlocking and clamping relationships just described are normally maintained during the operation of the torch, releasable spring means are provided and arranged to urge collet 14 rearwardly to a position at which the collet gripping fingers 12a—12d are in firm engagement with throat 14a of quill 14. The spring means should be constructed so that in addition to urging collet 12 rearwardly, it is also yieldable to permit collet 12 to move forwardly and thereby disengage gripping fingers 12a—12d from throat 14a.

In the specific embodiment of the drawing, the rear end portion 12e of collet 12 is externally threaded, and is threadedly connected to a hollow cap 15, which is designed to receive the rearwardmost portion of electrode 13 when the electrode is longer than body 10. Electrode cap 15 is provided at its inner end with an outwardly extending annular flange 15a, which bears against compression spring 16. The other end of compression spring 16 is received on the outwardly extending flange of nut 17, which is threadedly connected to the rearward end portion of quill 14. Thus, by adjusting cap 15 on collet 12 spring 16 can be compressed, and the forces thus set up will tend to urge cap 15 rearwardly and at the same time pulling gripping fingers 12a—12d into engagement with throat 14a.

As illustrated clearly in Figs. 1 and 2 of the drawing, cap 15 in effect provides a movable plunger which extends rearwardly beyond body 10, which plunger can be moved inwardly towards body 10 to effect the forward movement of collet 12. The forward movement of plunger 15 will further compress spring 16, since it is disposed about the rearward portion of collet 12 between cap flange 15a and the rearward flange portion of nut 17. In this way the clamping engagement between gripping fingers 12a—12d and electrode 13 can be released, the clamped and released positions being respectively illustrated in Figs. 1 and 2 of the drawing. After the release of electrode 13 by the forward movement of plunger 15 to a position such as is illustrated in Fig. 2, it will slide forwardly under its own weight to an extended position, which can be controlled by letting the tip of the electrode descend until it touches a horizontal surface, such as that of a table. When plunger 15 is released, the collet will return to the position illustrated in Fig. 1 by the action of spring 16, and electrode 13 will be projecting outwardly further from body 10 than before the adjustment. Alternatively, if desired electrode 13 can be moved rearwardly with respect to collet 12 when the plunger 15 is in its depressed position by pressing the electrode tip against any convenient surface, thereby shortening the extent of projection of electrode 13. Thus, the electrode can be shifted either inwardly or outwardly by using only one hand.

In order to protect the operator against the heat generated during the welding operation, and especially if it is desired to adjust the electrode position without waiting for the torch to cool, it is preferred to also have cap 15 formed of a heat insulating material, such as hard rubber or plastic. Further, it is preferred to provide within body 10 a water-cooling jacket 18, the cooling jacket being disposed about collet 12 and in heat-transferring relation therewith. In the illustration given, cooling jacket 18 is provided by spacing the outer wall of quill 14 from the inner wall of a tubular insert 19, and providing suitable sealing means for the space between these two walls. The upper end of cooling chamber 18, in the illustration given, is sealed by O-ring 20, and the bottom end is sealed by an annular gasket 21. Preferably, tubular insert 19 is formed of metal and is inserted within body 10 during the formation of the body by a molding operation, thereby assuring that a suitable opening will be provided through the body.

As shown in Fig. 1, body extension 10c is provided internally with a plurality of passages 22, 23, 24 and 25, which although illustrated in the same plane for convenience would, in practice, preferably be offset with each other. Passages 22 and 23 communicate with water jacket 18 and are respectively connected to conduits 26 and 27, conduit 26 being the water outlet pipe and conduit 27 the water inlet pipe. The small metal tube forming the wall of passage 22 is preferably electrically conductive and is connected to a power supply cable 28, which is positioned inside of the water outlet conduit 26.

The other passages 24 and 25 are respectively for the supply of argon and carbon dioxide, passage 24 discharging into argon nozzle 29, and passage 25 discharging into carbon dioxide nozzle 30. This arrangement provides a double layer gas mantle or shield about the projecting end portion of electrode 13 during the welding operation. The other ends of passages 24 and 25 are respectively connected to argon supply conduit 31 and carbon dioxide supply conduit 32. Other gas combinations can also be used with the illustrated torch.

It is also preferred to provide a body tail or extension 33 for enclosing spring 16 and cap 15, as illustrated in Figs. 1 and 2 of the drawing. Body tail 33 provides an enlarged inner chamber 34 for receiving spring 16 and cap flange 15a while having a smaller rearwardly extending opening 35 for slidably receiving cap 15. Body tail 33 is also provided with a forwardly extending connection ring portion 36 which is externally threaded, and thereby threadedly connected to the internally threaded portion 10b of body 10.

While the specific materials of construction for the welding torch are not critical, certain preferred characteristics of the materials comprising some of the structural elements of the torch have already been indicated. For example, the torch body 10, body tail 33 and plunger cap 15 are all preferably formed of non-metallic heat insulating materials like hard rubber or various plastics such as nylon. The other elements described above, with the exception of sealing rings 20 and 21 will usually be formed of metal, and it is particularly important that certain of the elements be conductive of heat and/or electricity. Specifically, collet 12 can be formed of copper plated case hardened steel, quill 14 of leaded copper, etc. With the arrangement shown, collet 12 as well as quill 14 should be conductive of both heat and electricity.

While in the foregoing specification this invention has been decsribed in relation to a specific embodiment thereof, it will be apparent to those skilled in the art that the invention is susceptible to other embodiments and that many of the details of the particular embodiment described herein can be varied considerably without departing from the basic idea of the invention.

I claim:

In combination with an arc welding torch having a body with front and rear ends and having an angularly-disposed extension secured to said body intermediate said ends, said extension providing a hand grip near the rear end of said body, said body having an opening extending therethrough between said ends, a collet slidably supported within said body opening and in turn being adapted for slidably receiving a non-depositing electrode, said collet having means associated therewith for releasably gripping said electrode, means within said body opening for actuating said gripping means to grip said electrode and for clamping said collet against further rearward movement when said collet has moved rearwardly to a certain position, releasable spring means arranged to urge said collet rearwardly toward said certain position while yielding to permit said collet to move forwardly from said position, and slidable plunger means operatively connected to the rearward portion of said collet for moving said collet forwardly from said certain position against said spring means and thereby releasing said gripping means, said spring means being sufficiently compressible to permit said gripping means to be fully released, said plunger normally projecting outwardly beyond the rear end of said body and being disposed closely adjacent to said hand grip, whereby said plunger can be operated with the hand holding said grip.

References Cited in the file of this patent
UNITED STATES PATENTS

| | | |
|---|---|---|
| 223,498 | Fraser | Jan. 13, 1880 |
| 1,539,221 | Tennant | May 26, 1925 |
| 2,358,158 | Gibbert | Sept. 12, 1944 |
| 2,659,797 | Anderson et al. | Nov. 17, 1953 |